(12) United States Patent
Lee

(10) Patent No.: US 11,590,649 B2
(45) Date of Patent: Feb. 28, 2023

(54) GRIP MANIPULATOR AND METHOD FOR CONTROLLING THE SAME

(71) Applicant: LG ELECTRONICS INC., Seoul (KR)

(72) Inventor: Wonhee Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 679 days.

(21) Appl. No.: 16/555,686

(22) Filed: Aug. 29, 2019

(65) Prior Publication Data

US 2019/0381656 A1 Dec. 19, 2019

(30) Foreign Application Priority Data

Aug. 6, 2019 (KR) .................. 10-2019-0095551

(51) Int. Cl.
*B25J 9/16* (2006.01)
*B25J 15/10* (2006.01)

(52) U.S. Cl.
CPC ............. *B25J 9/1612* (2013.01); *B25J 15/10* (2013.01)

(58) Field of Classification Search
CPC . B25J 9/1612; B25J 15/10; B25J 9/163; B25J 15/0253; B25J 13/086; B25J 19/02; B25J 15/0009; B25J 15/024; B25J 15/0293; B25J 15/0004; B25J 15/0028; B25J 13/02; B25J 11/0095; B25J 15/0052; B25J 15/0071; B25J 15/009; B25J 15/12; G05B 2219/39459; G05B 2219/39481; G05B 2219/39491; G05B 2219/39497; G05B 2219/39466; B21J 13/14; B23D 41/06; B29C 49/70; B22D 17/2236; B21D 45/00; B21D 28/14

See application file for complete search history.

(56) References Cited

U.S. PATENT DOCUMENTS

| | | | |
|---|---|---|---|
| 2006/0012197 A1* | 1/2006 | Anderson | B25J 15/0028 294/106 |
| 2011/0178638 A1 | 7/2011 | Tsusaka et al. | |
| 2015/0019013 A1* | 1/2015 | Rose | B25J 9/1612 702/41 |
| 2020/0078959 A1* | 3/2020 | Sakakibara | B25J 15/026 |
| 2020/0306995 A1* | 10/2020 | Yerazunis | B25J 15/0009 |
| 2021/0170587 A1* | 6/2021 | Tanishima | B25J 15/0286 |
| 2021/0178607 A1* | 6/2021 | Saadat | B25J 15/02 |
| 2021/0197403 A1* | 7/2021 | Kim | B25J 15/0233 |

* cited by examiner

*Primary Examiner* — Abby Y Lin
*Assistant Examiner* — Esvinder Singh
(74) *Attorney, Agent, or Firm* — Birch, Stewart, Kolasch & Birch, LLP

(57) ABSTRACT

The present disclosure provides a grip manipulator used in a robot to eliminate an inefficient and power consumable operation caused by the use of multiple manipulators when gripping an object or handling the gripped object. The grip manipulator includes a manipulator body, a support rod of a first group and a support rod of a second group provided to protrude from the manipulator body in a direction, a longitudinal drive unit configured to discharge or introduce the support rod of the first group or the support rod of the second group in the protruding direction, and a transverse drive unit configured to spread or gather the support rod of the first support group or the support rod of the second group in a direction perpendicular to the protruding direction.

18 Claims, 11 Drawing Sheets

(a)             (b)

(a)

(b)

GRIP MANIPULATOR AND METHOD FOR CONTROLLING THE SAME

CROSS-REFERENCE TO RELATED APPLICATION

This application is based on and claims priority under 35 U.S.C. § 119(a) to Korean Patent Application No. 10-2019-0095551, which was filed on Aug. 6, 2019, in the Korean Intellectual Property Office, the disclosure of which is incorporated herein in its entirety by reference.

BACKGROUND OF THE INVENTION

Field of the Invention

The present disclosure relates to a grip manipulator which grips an object or performs an additional operation in the state of gripping the object and a method of controlling the same.

Related Art

A grip manipulator serves to grip an object or perform an additional operation on the object in the state of gripping the object. The grip manipulator needs to stably grip the object in order to prevent separation of the object and also needs to differently grip the object or change an object gripping method according to various situations. For example, a grip manipulator for use in a cooking robot may perform an operation of washing or slicing food. Conventionally, such a robot has usually been manufactured to include two grip manipulators. The two grip manipulators perform the operation of washing or sliding food in such a manner that they exchange the food and expose or protrude different portions of the food.

The gripping method described above, however, results in the consumption of a relatively large amount of resources because at least two grip manipulators are required.

SUMMARY OF THE INVENTION

The foregoing summary is illustrative only and is not intended to be in any way limiting. In addition to the illustrative aspects, embodiments, and features described above, further aspects, embodiments, and features will become apparent by reference to the drawings and the following detailed description.

The present disclosure is devised to eliminate an inefficient and power consumable operation caused by the use of multiple manipulators when gripping an object or handling the gripped object by a robot having a manipulator.

In order to achieve the above, according to one aspect of the present disclosure, there is provided a grip manipulator including a manipulator body, a support rod of a first group and a support rod of a second group provided to protrude from the manipulator body in a direction, a longitudinal drive unit configured to discharge or retract the support rod of the first group or the support rod of the second group in the protruding direction, and a transverse drive unit configured to spread or gather the support rod of the first group or the support rod of the second group in a direction perpendicular to the protruding direction.

In addition, according to another aspect of the present disclosure, there is provided a grip manipulator further including a controller configured to control driving of each of the longitudinal drive unit and the transverse drive unit.

A grip manipulator according to the present disclosure has the following effects.

According to at least one of the embodiments of the present disclosure, it is possible to grip an object in different ways while changing the gripped state of the object using one grip manipulator.

In addition, according to at least one of the embodiments of the present disclosure, it is possible to easily perform, for example, an operation of washing or processing an object by changing the gripped state of the object using one grip manipulator.

In addition, according to at least one of the embodiments of the present disclosure, it is possible to reduce the power consumption and the operating time of a robot by reducing the number of grip manipulators used in the same operation as compared with the related art.

The additional range of the applicability of the present disclosure will be apparent from the following detailed description. However, since various changes and corrections within the spirit and scope of the present disclosure will be clearly understood by those skilled in the art, the following detailed description and specific embodiments such as exemplary embodiments of the present disclosure should be understood as being merely given by way of example.

BRIEF DESCRIPTION OF THE DRAWINGS

The above and other aspects, features, and advantages of certain embodiments will be more apparent from the following detailed description taken in conjunction with the accompanying drawings, in which.

DESCRIPTION OF EXEMPLARY EMBODIMENTS

Figure 1:
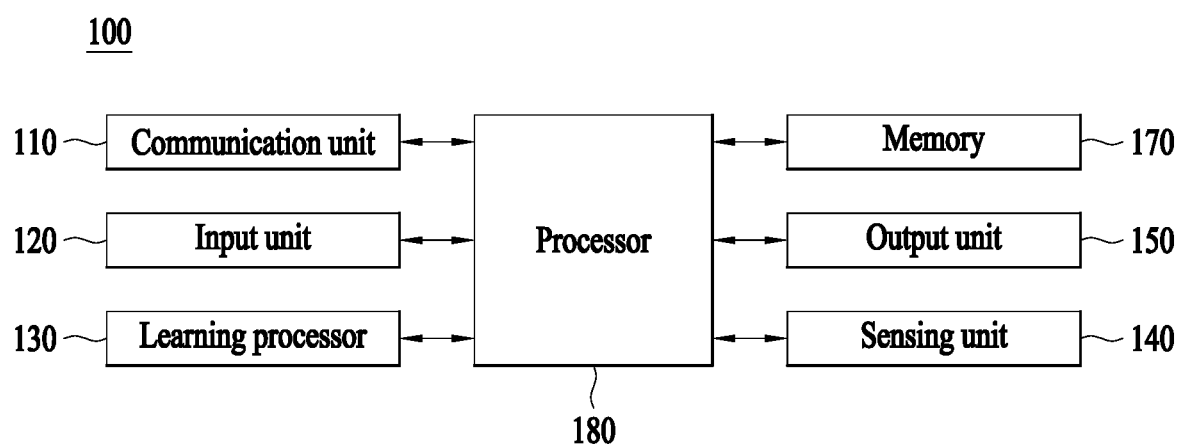
FIG. 1 illustrates an AI device according to an embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the drawings so that those skilled in the art can easily carry out the present disclosure. The present disclosure may be embodied in many different forms and is not limited to the embodiments described herein.

With respect to constituent elements used in the following description, suffixes "module" and "unit" are given or mingled with each other only in consideration of ease in the preparation of the specification, and do not have or serve as different meanings.

In order to clearly describe the present disclosure, elements having no connection with the description are omitted, and the same or extremely similar elements are designated by the same reference numerals throughout the specification. In addition, some embodiments of the present disclosure will be described in detail with reference to exemplary drawings. When adding reference numerals to constituent elements of the respective drawings, it should be noted that the same or similar elements are denoted by the same reference numerals even though they are depicted in different drawings. In addition, in the following description of the present disclosure, a detailed description of known functions and configurations incorporated herein will be omitted when it may make the subject matter of the present disclosure rather unclear.

In addition, it will be understood that the terms first, second, A, B, (a), and (b), for example, may be used herein to describe various elements according to the embodiments of the present disclosure. These terms are only used to distinguish one element from another element and, thus, are not intended to limit the essence, order, sequence, or number of elements. It will be understood that, when any element is referred to as being "connected to" "coupled to", or "joined to" another element, it may be directly on, connected to or coupled to the other element or intervening elements may be present.

It will be further understood that the terms "comprises" "comprising" "includes" and/or "including" when used in this specification, specify the presence of stated features, integers, steps, operations, elements, and/or components, but do not preclude the presence or addition of one or more other features, integers, steps, operations, elements, and/or components.

In addition, for convenience of description, the present disclosure may be embodied by subdividing constituent elements, but these constituent elements may be embodied in a single device or module, or one constituent element may be divided into multiple devices or modules.

Prior to describing various embodiments of the present disclosure, key terms will be described as follows.

"Artificial Intelligence (AI)" refers to the field of studying artificial intelligence or a methodology capable of making the artificial intelligence, and "machine learning" refers to the field of studying methodologies that define and solve various problems handled in the field of artificial intelligence. The machine learning is also defined as an algorithm that enhances performance for a certain operation through a steady experience with respect to the operation.

"Artificial neural network (ANN)" may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

"Robot" may refer to a machine that automatically operates or performs a given operation by abilities thereof. In particular, a robot that functions to recognize an environment and perform a motion based on self-determination may be referred to as an intelligent robot.

Robots may be classified into industrial, medical, household, and military robots, for example, according to the purpose of use or the field of use thereof.

The robot may include a drive unit including an actuator or a motor to perform various physical motions such as a motion of moving a robot joint arm. In addition, particularly, a movable robot may include a wheel, a brake, or a propeller, for example, in the drive unit to travel on the ground or fly in the air via the drive unit.

FIG. 1 illustrates AI device 100 according to an embodiment of the present disclosure.

AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a refrigerator, a digital signage, a robot, a vehicle, or an XR device.

Referring to FIG. 1, AI device 100 may include a communication unit 110, an input unit 120, a learning processor 130, a sensing unit 140, an output unit 150, a memory 170, and a processor 180, for example.

Communication unit 110 may transmit and receive data to and from external devices, such as other AI devices 100a to 100e and an AI server 200, using wired/wireless communication technologies. For example, communication unit 110 may transmit and receive sensor information, user input, learning models, and control signals, for example, to and from external devices.

At this time, the communication technology used by communication unit 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 120 may acquire various types of data.

At this time, input unit 120 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 120 may acquire, for example, input data to be used when acquiring an output using learning data for model learning and a learning model. Input unit 120 may acquire unprocessed input data, and in this case, processor 180 or learning processor 130 may extract an input feature as pre-processing for the input data.

Learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 130 may perform AI processing along with a learning processor 240 of AI server 200.

At this time, learning processor 130 may include a memory integrated or embodied in AI device 100. Alternatively, learning processor 130 may be realized using memory 170, an external memory directly coupled to AI device 100, or a memory held in an external device.

Sensing unit 140 may acquire at least one of internal information of AI device 100 and surrounding environmental information and user information of AI device 100 using various sensors.

At this time, the sensors included in sensing unit 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar, for example.

Output unit 150 may generate, for example, a visual output, an auditory output, or a tactile output.

At this time, output unit 150 may include, for example, a display that outputs visual information, a speaker that outputs auditory information, and a haptic module that outputs tactile information.

Memory 170 may store data which assists various functions of AI device 100. For example, memory 170 may store input data acquired by input unit 120, learning data, learning models, and learning history, for example.

Processor 180 may determine at least one executable operation of AI device 100 based on information determined or generated using a data analysis algorithm or a machine learning algorithm. Then, processor 180 may control constituent elements of AI device 100 to perform the determined operation.

To this end, processor 180 may request, search, receive, or utilize data of learning processor 130 or memory 170, and may control the constituent elements of AI device 100 so as to execute a predictable operation or an operation that is deemed desirable among the at least one executable operation.

At this time, when connection of an external device is necessary to perform the determined operation, processor 180 may generate a control signal for controlling the external device and may transmit the generated control signal to the external device.

Processor 180 may acquire intention information with respect to user input and may determine a user request based on the acquired intention information.

At this time, processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 130, may have learned by learning processor 240 of AI server 200, or may have learned by distributed processing of processors 130 and 240.

Processor 180 may collect history information including, for example, the content of an operation of AI device 100 or feedback of the user with respect to an operation, and may store the collected information in memory 170 or learning processor 130, or may transmit the collected information to an external device such as AI server 200. The collected history information may be used to update a learning model.

Processor 180 may control at least some of the constituent elements of AI device 100 in order to drive an application program stored in memory 170. Moreover, processor 180 may combine and operate two or more of the constituent elements of AI device 100 for the driving of the application program.

Figure 2:
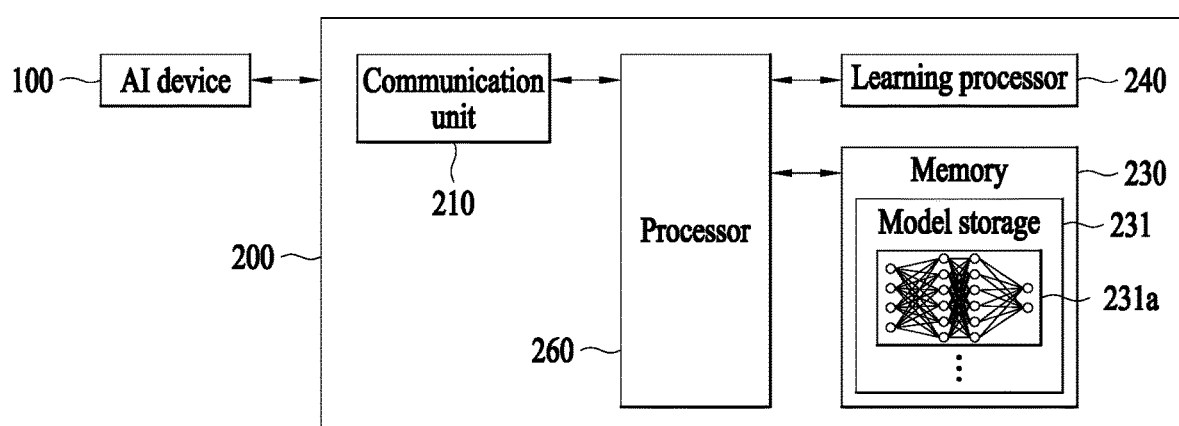
FIG. 2 illustrates an AI server according to an embodiment of the present disclosure.

FIG. 2 illustrates AI server 200 according to an embodiment of the present disclosure.

Referring to FIG. 2, AI server 200 may refer to a device that causes an artificial neural network to learn using a machine learning algorithm or uses the learned artificial neural network. Here, AI server 200 may be constituted of multiple servers to perform distributed processing, and may be defined as a 5G network. At this time, AI server 200 may be included as a constituent element of AI device 100 so as to perform at least a part of AI processing together with AI device 100.

AI server 200 may include a communication unit 210, a memory 230, a learning processor 240, and a processor 260, for example.

Communication unit 210 may transmit and receive data to and from an external device such as AI device 100.

Memory 230 may include a model storage unit 231. Model storage unit 231 may store a model (or an artificial neural network) 231a which is learning or has learned via learning processor 240.

Learning processor 240 may cause artificial neural network 231a to learn learning data. A learning model may be used in the state of being mounted in AI server 200 of the artificial neural network, or may be used in the state of being mounted in an external device such as AI device 100.

The learning model may be realized in hardware, software, or a combination of hardware and software. In the case in which a part or the entirety of the learning model is realized in software, one or more instructions constituting the learning model may be stored in memory 230.

Processor 260 may deduce a result value for newly input data using the learning model, and may generate a response or a control instruction based on the deduced result value.

Figure 3:
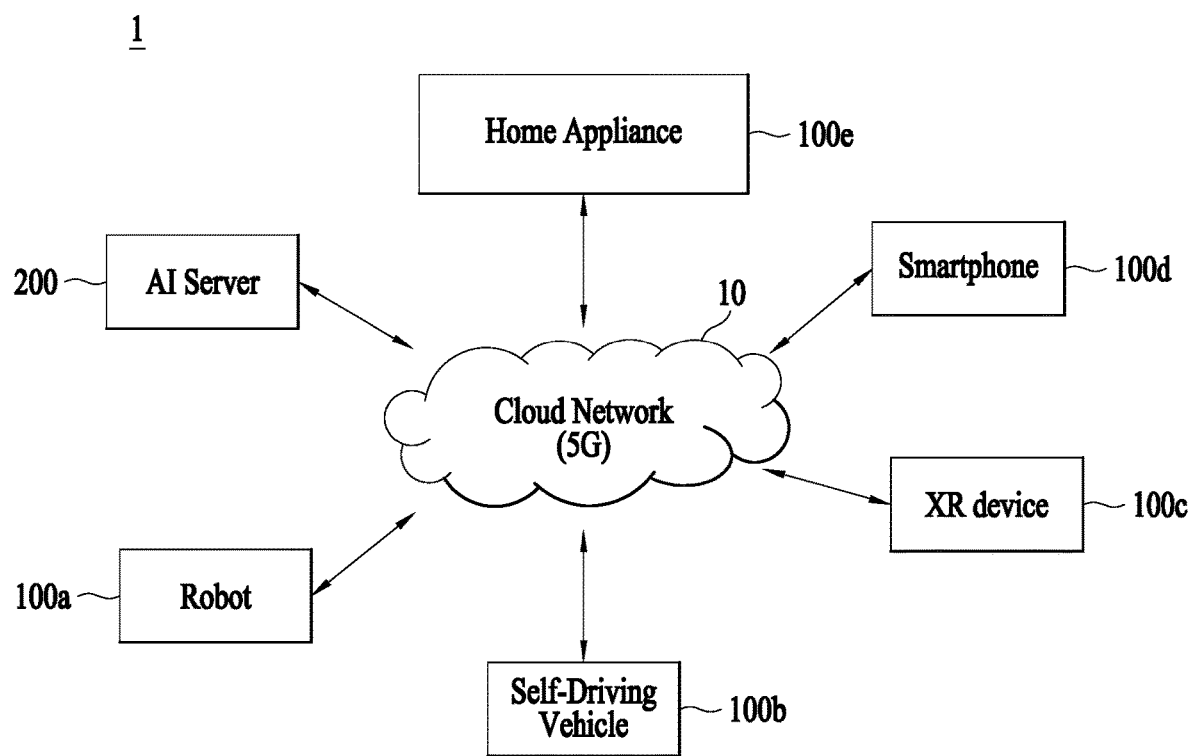
FIG. 3 illustrates an AI system according to an embodiment of the present disclosure.

FIG. 3 illustrates AI system 1 according to an embodiment of the present disclosure.

Referring to FIG. 3, in AI system 1, at least one of AI server 200, a robot 100a, an autonomous vehicle 100b, an XR device 100c, a smart phone 100d, and a home appliance 100e is connected to a cloud network 10. Here, robot 100a, autonomous vehicle 100b, XR device 100c, smart phone 100d, and home appliance 100e, to which AI technologies are applied, may be referred to as AI devices 100a to 100e.

Cloud network 10 may constitute a part of a cloud computing infra-structure, or may mean a network present in the cloud computing infra-structure. Here, cloud network 10 may be configured using a 3G network, a 4G or long term evolution (LTE) network, or a 5G network, for example.

That is, respective devices 100a to 100e and 200 constituting AI system 1 may be connected to each other via cloud network 10. In particular, respective devices 100a to 100e and 200 may communicate with each other via a base station, or may perform direct communication without the base station.

AI server 200 may include a server which performs AI processing and a server which performs an operation with respect to big data.

AI server 200 may be connected to at least one of robot 100a, autonomous vehicle 100b, XR device 100c, smart phone 100d, and home appliance 100e, which are AI devices constituting AI system 1, via cloud network 10, and may assist at least a part of AI processing of connected AI devices 100a to 100e.

At this time, instead of AI devices 100a to 100e, AI server 200 may cause an artificial neural network to learn according to a machine learning algorithm, and may directly store a learning model or may transmit the learning model to AI devices 100a to 100e.

At this time, AI server 200 may receive input data from AI devices 100a to 100e, may deduce a result value for the received input data using the learning model, and may generate a response or a control instruction based on the deduced result value to transmit the response or the control instruction to AI devices 100a to 100e.

Alternatively, AI devices 100a to 100e may directly deduce a result value with respect to input data using the learning model, and may generate a response or a control instruction based on the deduced result value.

Hereinafter, various embodiments of AI devices 100a to 100e, to which the above-described technology is applied, will be described. Here, AI devices 100a to 100e illustrated in FIG. 3 may be specific embodiments of AI device 100 illustrated in FIG. 1.

Robot 100a may be realized into a guide robot, a transportation robot, a cleaning robot, a wearable robot, an entertainment robot, a pet robot, or an unmanned flying robot, for example, through the application of AI technologies.

Robot 100a may include a robot control module for controlling an operation, and the robot control module may refer to a software module or a chip realized in hardware.

Robot 100a may acquire information on the state of robot 100a using sensor information acquired from various types of sensors, may detect (recognize) the surrounding environment and an object, may generate map data, may determine a movement route and a driving plan, may determine a response with respect to user interaction, or may determine an operation.

Here, robot 100a may use sensor information acquired from at least one sensor among a lidar, a radar, and a camera in order to determine a movement route and a driving plan.

Robot 100a may perform the above-described operations using a learning model configured with at least one artificial neural network. For example, robot 100a may recognize the surrounding environment and the object using the learning model, and may determine an operation using the recognized surrounding environment information or object information. Here, the learning model may be directly learned in robot 100a, or may be learned in an external device such as AI server 200.

At this time, robot 100a may directly generate a result using the learning model to perform an operation, but may transmit sensor information to an external device such as AI server 200 and receive a result generated by the external device to perform an operation.

Robot 100a may determine a movement route and a driving plan using at least one of map data, object information detected from sensor information, and object information acquired from an external device, and a drive unit may be controlled to drive robot 100a according to the determined movement route and driving plan.

The map data may include object identification information for various objects arranged in a space along which robot 100a moves. For example, the map data may include object identification information for stationary objects, such as the wall and the door, and movable objects such as a flowerpot and a desk. Then, the object identification information may include names, types, distances, and locations, for example.

In addition, robot 100a may perform an operation or may drive by controlling the drive unit based on user control or interaction. At this time, robot 100a may acquire interactional intention information depending on a user operation or voice expression, and may determine a response based on the acquired intention information to perform an operation.

Robot 100a may be realized into a guide robot, a transportation robot, a cleaning robot, a wearable robot, an entertainment robot, a pet robot, or an unmanned flying robot, for example, through the application of AI technologies and autonomous driving technologies.

Robot 100a, to which AI technologies and autonomous driving technologies are applied, may refer to a robot having an autonomous driving function or a robot that interacts with autonomous vehicle 100b, for example.

Robot 100a having an autonomous driving function may be a common name of devices that move by themselves along a given moving line without user control, or move by determining a moving line by themselves.

Robot 100a and autonomous vehicle 100b, which have an autonomous driving function, may use a common sensing method in order to determine at least one of a movement route or a driving plan. For example, robot 100a and autonomous vehicle 100b, which have an autonomous driving function, may determine at least one of the movement route or the driving plan using information sensed by a lidar, a radar, and a camera.

Robot 100a, which interacts with autonomous vehicle 100b, may be provided separately from autonomous vehicle 100b so as to be connected to the autonomous driving function of autonomous vehicle 100b inside or outside autonomous vehicle 100b, or may perform an operation associated with a user who has got on autonomous vehicle 100b.

At this time, robot 100a, which interacts with autonomous vehicle 100b, may acquire sensor information instead of autonomous vehicle 100b to provide the information to autonomous vehicle 100b, or may acquire sensor information and generate surrounding environment information or object information to provide the information to autonomous vehicle 100b, thereby controlling or assisting the autonomous driving function of autonomous vehicle 100b.

Alternatively, robot 100a, which interacts with autonomous vehicle 100b, may monitor the user who has got on autonomous vehicle 100b or may control the functions of autonomous vehicle 100b via interaction with the user. For example, when it is determined that a driver is in a drowsy state, robot 100a may activate the autonomous driving function of autonomous vehicle 100b or may assist the control of a drive unit of autonomous vehicle 100b. Here, the functions of autonomous vehicle 100b controlled by robot 100a may include not only the autonomous driving function, but also a function provided in a navigation system or an audio system provided in autonomous vehicle 100b.

Alternatively, robot 100a, which interacts with autonomous vehicle 100b, may provide information to autonomous vehicle 100b or assist the function thereof at the outside of autonomous vehicle 100b. For example, robot 100a may serve as a smart traffic light that provides traffic information including, for example, traffic signal information to autonomous vehicle 100b, or may serve as an automatic electric charger of an electric vehicle that may interact with autonomous vehicle 100b and may be automatically connected to a charge port of the vehicle.

Robot 100a may be realized into a guide robot, a transportation robot, a cleaning robot, a wearable robot, an entertainment robot, a pet robot, an unmanned flying robot, or a drone, for example, through the application of AI technologies and XR technologies.

Robot 100a, to which the XR technologies are applied, may refer to a robot which is a control or interaction target in an XR image. In this case, robot 100a may be provided separately from XR device 100c and may operate in cooperation with XR device 100c.

When robot 100a, which is a control or interaction target in an XR image, acquires sensor information from sensors including a camera, robot 100a or XR device 100c may generate an XR image based on the sensor information, and XR device 100c may output the generated XR image. Then, such robot 100a may operate based on a control signal input through XR device 100c or via interaction with the user.

For example, the user may check the XR image corresponding to the viewpoint of robot 100a, which is remotely linked, via an external device such as XR device 100c, and may adjust an autonomous driving route of robot 100a or control an operation or driving thereof via interaction with the robot, or may check information on an object around thereof.

Figure 4:
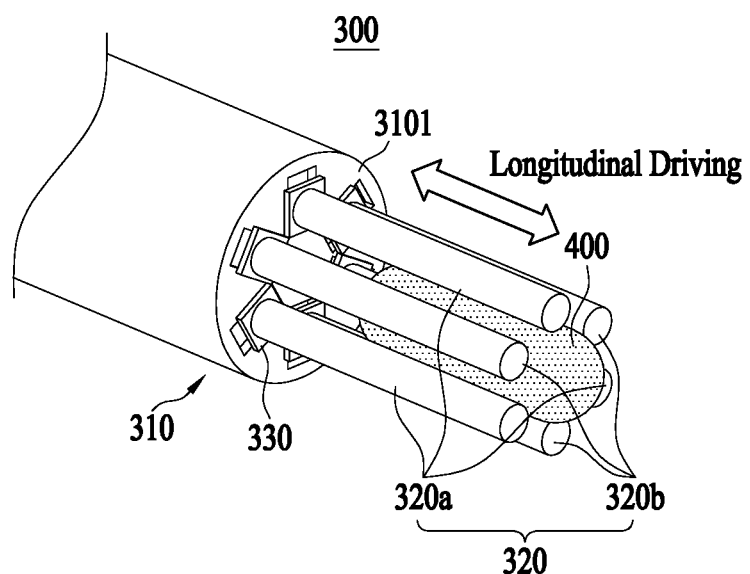
FIG. 4 is a front perspective view of a grip manipulator according to the present disclosure.

FIG. 4 is a front perspective view of a grip manipulator 300 according to the present disclosure.

Robot 100a (see FIG. 3) described above may include grip manipulator 300 as needed. A manipulator refers to a mechanical device that provides an operation similar to that of the human arm, and grip manipulator 300 is one type of manipulator that is capable of performing, for example, an operation of gripping or releasing an object 400, an operation of additionally handling object 400 in the state of gripping object 400, or an operation of pressing object 400.

In particular, when one robot 100a (see FIG. 3) includes multiple grip manipulators 300, multiple grip manipulators 300 may effectively perform operations associated with each other.

Grip manipulator 300 according to the present disclosure is not limited as to the purpose of use thereof. For example, grip manipulator 300, to which features of the present disclosure are applied, may be used in industry, or may be used in a household (more particularly, cooking) robot. Moreover, needless to say, grip manipulator 300 may also be used in medical and health fields. However, for the convenience of description, the following description will be made under the assumption that grip manipulator 300 is used in the field of cooking.

Grip manipulator 300 may include multiple support rods 320 for gripping object 400 (for example, a potato). Multiple support rods 320 take the form of bars protruding from a manipulator body 310.

Manipulator body 310 may be a housing which defines an electric element chamber in which at least some of elements for driving support rods 320 are mounted. Manipulator body 310 further provides a space into which support rods 320 may be retracted. In one example, manipulator body 310 may take the form of a cylinder, and the electric element chamber may be defined inside the cylinder. Multiple support rods 320 may be provided in a circular region of the cylinder so as to be retracted into manipulator body 310 in the form of the cylinder.

Multiple support rods 320 may be driven so as to be discharged from or retracted into manipulator body 310 in the direction in which support rods 320 protrude. This operation will be defined herein as longitudinal driving. Multiple support rods 320 protruding from manipulator body 310 may be parallel to each other, and these parallel support rods 320 may be equidistantly spaced apart from each other so as to surround object 400 laterally. In particular, multiple support rods 320 may be arranged on the circumference of a certain region of manipulator body 310 to form a circular track. Thereby, multiple support rods 320 may most flexibly cope with an unspecified shape of object 400.

Multiple support rods 320 are sorted into multiple groups which are driven independently of each other. In a simplified example, multiple support rods 320 may be sorted into support rods 320a of a first group and support rods 320b of a second group. Support rods 320 of each group are moved together. For example, multiple support rods included in one group may be retracted or discharged together, or may spread or gather together.

Thus, the longitudinal driving of support rods 320a of the first group and the longitudinal driving of support rods 320b of the second group are performed independently of each other. For example, while support rods 320a of the first group are discharged by a predetermined distance, support rods 320b of the second group may be stationary in place without movement or may be retract by a predetermined distance, and vice versa.

Figure 5:
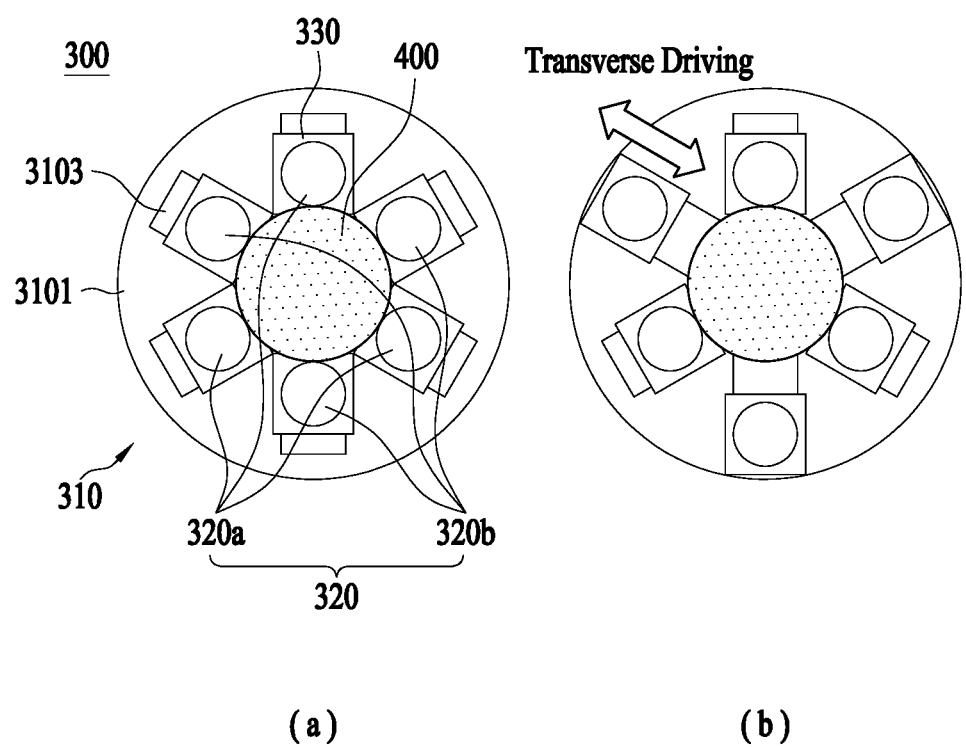
FIG. 5 is a front view of the grip manipulator according to the present disclosure.

FIG. 5 is a front view of grip manipulator 300 according to the present disclosure. For the convenience of description, reference will be made in conjunction with FIG. 4.

Meanwhile, support rods 320a of the first group or support rods 320b of the second group may gather toward each other or may spread away from each other in order to grip or release object 400. This operation will be defined herein as transverse driving.

Thus, each support rod 320 may have a two degrees-of-freedom (2-DOF) to perform longitudinal driving (a discharge or retraction operation) and transverse driving (a gathering or spreading operation).

Manipulator body 310 may have an opening 3103 in a region thereof in which each support rod 320 protrudes. Opening 3103 may have a shape corresponding to the longitudinal cross section of each support rod 320 and also corresponding to the transverse driving of each support rod 320. That is, opening 3103 may provide a sufficient area to prevent support rod 320 from being caught by opening 3103 when support rod 320 is discharged or retracted or when support rod 320 spreads or gathers. For example, in the case in which support rod 320 takes the form of a cylinder, opening 3103 in manipulator body 310 may have a width corresponding to the diameter of the cylinder. Alternatively, in the case in which support rod 320 is moved in the state in which it is coupled to opening 3103 via a holder 330, opening 3103 may have the same width as the width of holder 330. Details of holder 330 will be described below.

Support rod 320 may take the form of a cylinder, but may not be necessarily limited thereto, and may have any other shape as long as it appropriately grips object 400 without interference with opening 3103. For example, support rod 320 may take the form of a bar having a flat inner side surface in order to maximize the contact area between support rod 320 and object 400.

Support rod 320 may have a consistent longitudinal cross section within a certain longitudinal range. The certain longitudinal range may refer to the range over which support rod 320 passes through opening 3103 (or an opening in holder 330 which will be described below) when discharged from or retracted into manipulator body 310.

Support rods 320a of the first group and support rods 320b of the second group may be alternately provided. In addition, the first group includes at least three support rods 320a and the second group includes at least three support rods 320b. This serves to ensure stabilized gripping of object 400 even under the occurrence of the situation in which only support rods 320a of the first group or support rods 320b of the second group grip object 400.

A drive unit is provided to drive support rods 320 in response to an instruction from a controller. In particular, the drive unit may be realized by a motor. A drive unit that is in charge of the longitudinal driving of support rods 320 is referred to as a longitudinal drive unit, and a drive unit that is in charge of the transverse driving of support rods 320 is referred to as a transverse drive unit. The longitudinal drive unit and the transverse drive unit are separately provided in principle. The controller that controls the drive unit may be realized in the form of a processor chip such as a system-on-chip (SOC). The controller may be included in the above-described processor, or may include the above-described processor.

Figure 6:
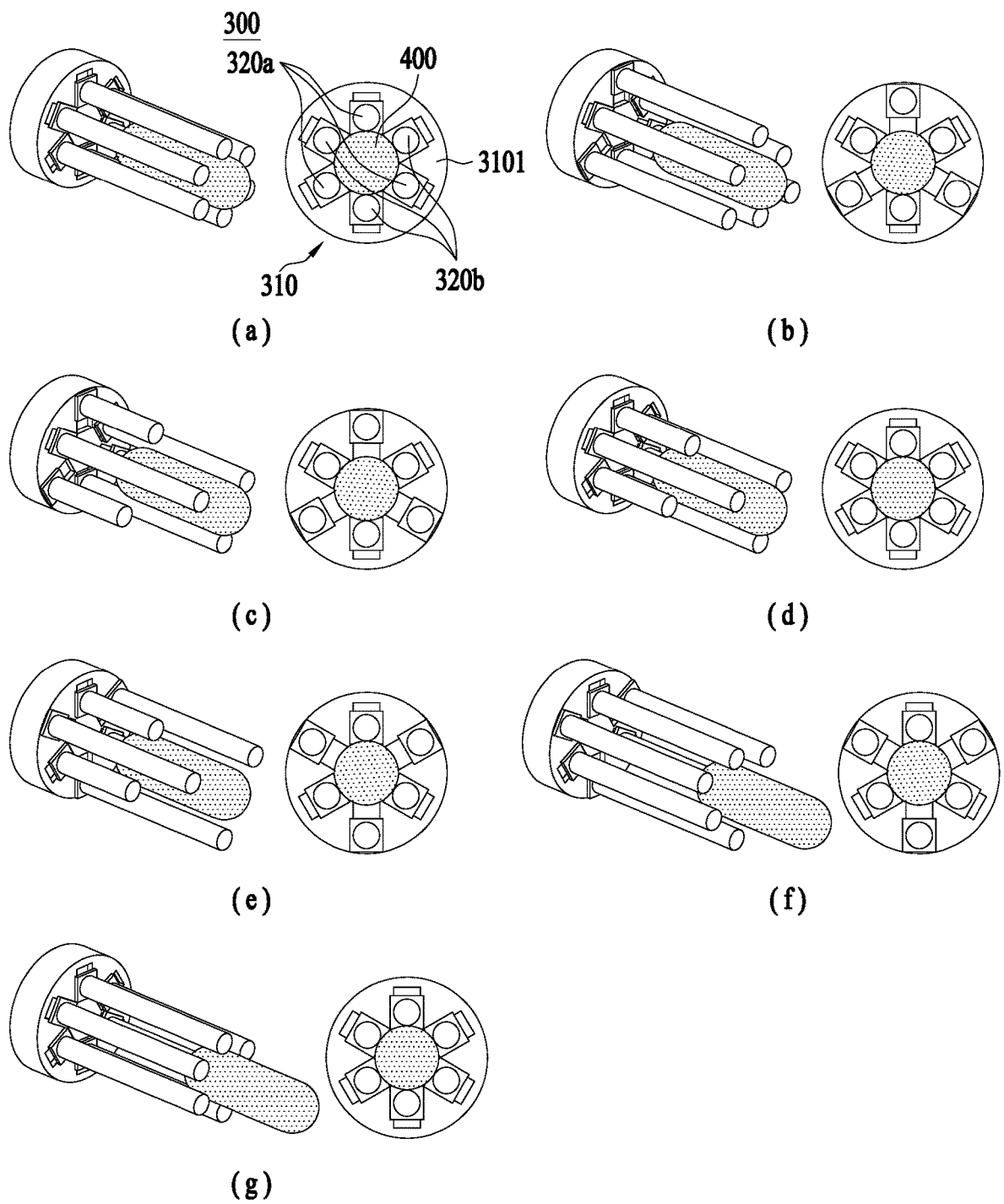
FIG. 6 illustrates perspective views and front views of a sequential process of moving an object by the grip manipulator according to the present disclosure.

FIG. 6 illustrates perspective views and front views of a sequential process of moving object 400 by grip manipulator 300 according to the present disclosure.

Grip manipulator 300, including support rods 320a of the first group and support rods 320b of the second group which perform longitudinal driving and transverse driving, may perform several representative operations. For example, as illustrated in FIG. 6, grip manipulator 300 may perform an operation of outwardly moving object 400 gripped by grip manipulator 300. Here, the term "outwardly" refers to the outer side of grip manipulator 300, i.e., the direction in which support rod 320 is discharged.

The state in which support rods 320a of the first group and support rods 320b of the second group grip object 400 (FIG. 6(a)) is assumed. The controller spreads support rods 320a of the first group so that only support rods 320b of the second group grip object 400 (FIG. 6(b)). Thereafter, the controller performs an operation of retracting support rods 320a of the first group, which have spread, into manipulator body 310 (FIG. 6(c)). Next, the controller gathers support rods 320a of the first group, which have been retracted, so that support rods 320a of the first group may grip object 400 (FIG. 6(d)). Once support rods 320a of the first group have gripped object 400, the controller spreads support rods 320b of the second group so that support rods 320b of the second group no longer grip object 400 (FIG. 6(e)). Thereafter, the controller discharges support rods 320a of the first group which have been retracted and gripped object 400 (FIG. 6(f)). As a result, object 400 has reached the state in which it is outwardly moved compared to the initial state thereof. When support rods 320b of the second group, which have spread, gather to grip object 400, support rods 320a of the first group as well as support rods 320b of the second group grip object 400, and object 400 is in a further outwardly moved state (FIG. 6(g)) compared to the state of FIG. 6(a).

That is, through grip manipulator 300 of the present disclosure including support rods 320a of the first group and support rods 320b of the second group, which are driven independently of each other, it is possible to realize both outward movement and inward movement of object 400 using only one grip manipulator 300.

At this time, it is to be noted that the discharge of support rods of a specific group in the above-described process may be replaced with the retraction of support rods of another group.

The process of outwardly moving object 400 may be adopted in various situations such as washing, assembling, slicing, and processing of object 400.

The controller may issue an instruction for the above-described sequence of operations of outwardly moving object 400, and a set of instructions for the respective operations is defined as a discharge instruction for object 400. The discharge instruction for object 400 may be stored in a memory of robot 100a (see FIG. 3) and may be loaded and used as needed. The degree of spreading or gathering support rods 320 and the degree of discharging or retracting support rods 320 may be changed in various ways according to the size, the shape, the characteristics, or the driving purpose of object 400. To this end, grip manipulator 300 or robot 100a (see FIG. 3) having grip manipulator 300 may include components for sensing the characteristics or the state of object 400. For example, the sensing components may include at least one of a pressure sensor, an image sensor, a humidity sensor, and a distance sensor. A value measured by at least one sensor, for example, the degree by which object 400 protrudes from grip manipulator 300 (or the distance from manipulator body 310 to object 400) may be used in calculations of the controller, and the calculated result may be transmitted to the drive unit so as to be used in the driving of support rods 320a of the first group or support rods 320b of the second group.

In addition, the above-described sequence of operations may be repeated. This is because an appropriate movement distance may change according to the size of object 400 and because object 400 may be outwardly moved a long distance at once, which may cause an unwanted state not suitable for the material and the shape of object 400 (for example, when circularly slicing a green onion, it is more effective to successively slice the green onion by slightly moving the green onion than moving the green onion a long distance at once). Thus, the distance by which support rods 320*a* or 320*b* of each group are discharged or retracted may be preset (regardless of the length of entire object 400).

At this time, to allow the above-described sequence of operations to be consistently repeated, the distance by which support rods 320*a* or 320*b* of each group are discharged and the distance by which support rods 320*a* or 320*b* of each group are retracted may be preset to the same value.

The above-described sequence of operations may be repeated a preset number of times, or may be repeated until object 400 is separated. The case in which the operations are repeated a preset number of times is appropriate when slicing a required amount of object 400. On the other hand, the case in which the operations are repeated until object 400 is separated is appropriate when slicing entire object 400.

Meanwhile, the above-described sequence of operations may be repeated immediately before object 400 is separated. For example, this serves to prevent object 400 from being completely separated from support rods 320 when attempting to outwardly discharge object 400 in order to perform a certain operation. Whether or not object 400 is in the state immediately before it is separated may be determined via a distance sensor provided on manipulator body 310. When the distance from manipulator body 310 to object 400, measured by the distance sensor, exceeds a preset threshold, the controller may stop the above-described sequence of operations to prevent object 400 from being completely separated.

Meanwhile, the operations described above may be performed in reverse order by a retraction instruction for object 400 from the controller. The features of the operation of discharging object 400 may be equally applied to the operation of retracting object 400, and thus a description related to the operation of retracting object 400 will be omitted to prevent duplication of description.

Figure 7:
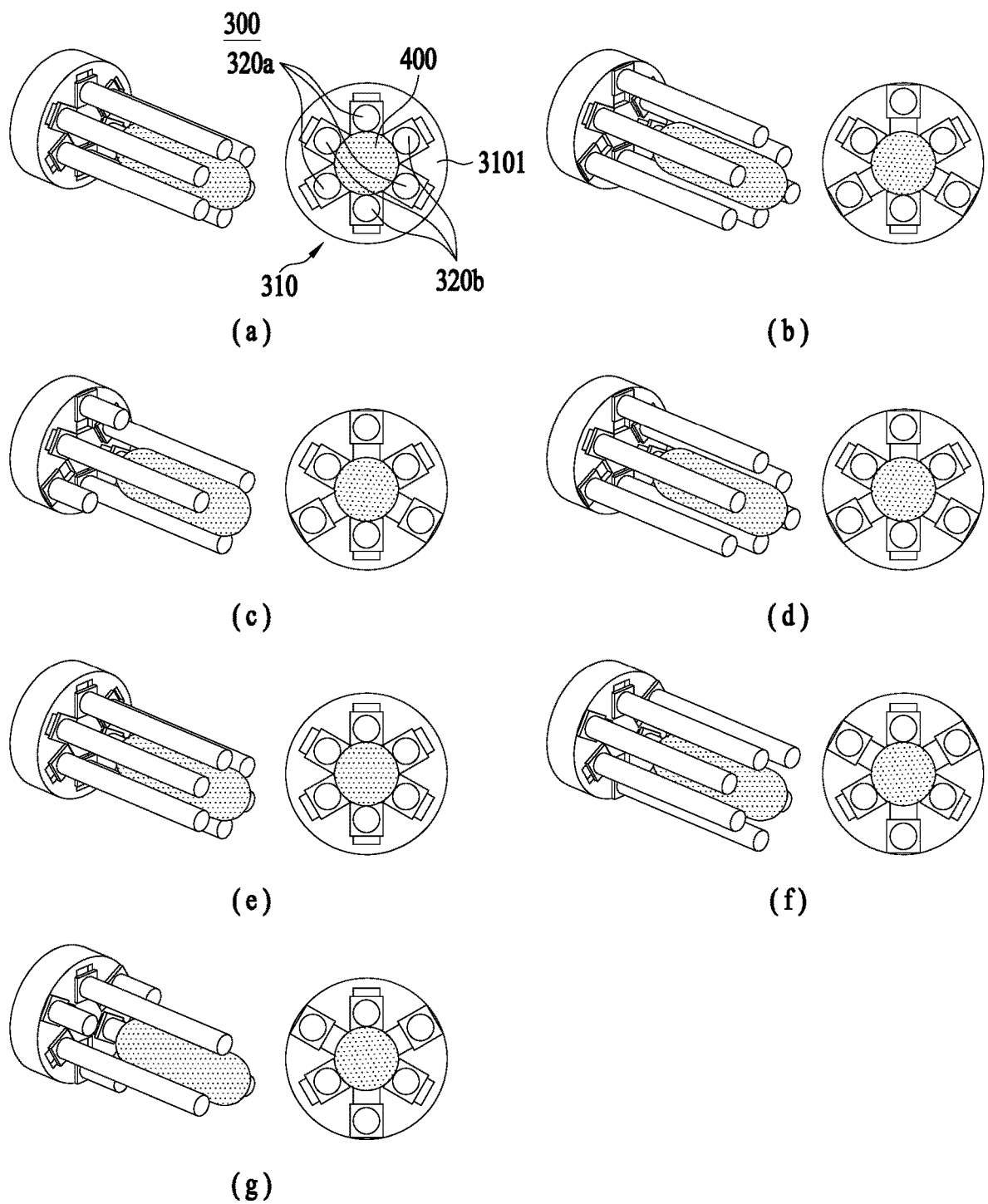
FIG. 7 illustrates perspective views and front views of a sequential process of washing an object by the grip manipulator according to the present disclosure.

FIG. 7 illustrates perspective views and front views of a sequential process of washing object 400 by grip manipulator 300 according to the present disclosure.

The process of controlling the drive unit by the discharge instruction for object 400 from the controller to control support rods 320*a* of the first group and support rods 320*b* of the second group has been described above with reference to FIG. 6. In the embodiment of FIG. 7, the process of alternately gripping object 400 by the support rods of the respective groups in order to wash object 400 will be described. Needless to say, the features described with reference to FIG. 6 may be similarly or equally applied to the present embodiment, or may be applied along with the features of FIG. 7 within the range not causing contradiction.

When washing object 400, support rods 320*a* and 320*b* gripping object 400 for fixing object 400 may hinder washing. Therefore, grip manipulator 300 of the present disclosure may be configured to perform washing in such a manner that support rods 320*a* of the first group and support rods 320*b* of the second group alternately grip object 400.

More specifically, when assuming the state in which support rods 320*a* of the first group and support rods 320*b* of the second group grip object 400 (FIG. 7(*a*)), support rods 320*a* of the first group may spread so that only support rods 320*b* of the second group grip object 400 (FIG. 7(*b*)). Then, support rods 320*a* of the first group may be retracted so as not to cover object 400 (FIG. 7(*c*)). In this state, the controller sprays pressurizing water on object 400. Thereafter, in order to wash the region of object 400 covered with support rods 320*b* of the second group, support rods 320*a* of the first group, which have been retracted, are again discharged (FIG. 7(*d*)). Then, support rods 320*a* of the first group, which have been discharged, gather to grip object 400 (FIG. 7(*e*)), and support rods 320*b* of the second group gripping object 400 spread (FIG. 7(*f*)) and are retracted into manipulator body 310 (FIG. 7(*g*)). The controller may again issue an instruction of spraying pressurizing water on object 400.

An instruction of the controller to perform the above-described sequence of operations may be referred to as a washing instruction. The washing instruction may be issued to perform the above-described sequence of operations in reverse order as needed, or may be used in combination with the discharge instruction for object 400. This is because the outward movement of object 400 also serves to reduce the interference between support rods 320 and object 400 during washing.

Figure 8:
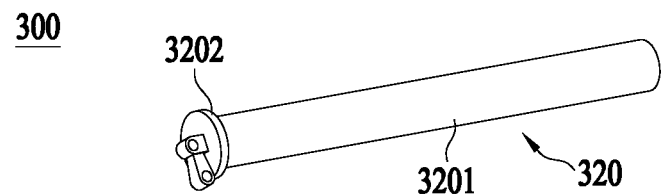
FIG. 8 is an exploded perspective view of the grip manipulator according to an embodiment of the present disclosure illustrating the state in which some components of the grip manipulator are assembled.
Figure 8:
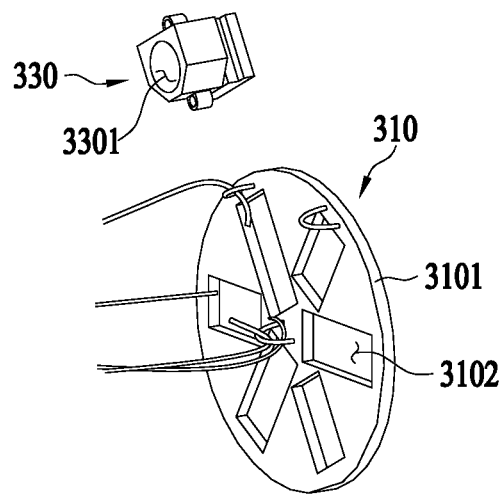
Figure 8:
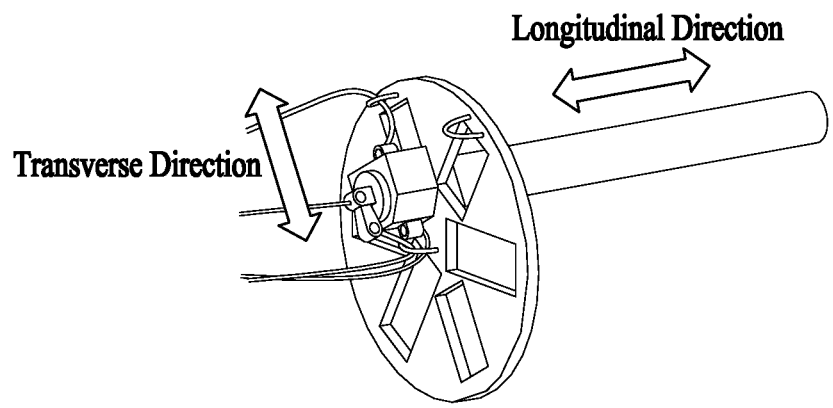

FIG. 8 is an exploded perspective view of grip manipulator 300 according to an embodiment of the present disclosure illustrating the state in which some components of grip manipulator 300 are assembled.

A concrete mechanism of the drive unit, which realizes the longitudinal driving and the transverse driving of support rods 320, will be described below.

In FIG. 8, only one surface 3101 of manipulator body 310, from which support rods 320 protrude, is illustrated, and illustration of other members or surfaces, which define the electric element chamber, is omitted. One surface 3101 of manipulator body 310, from which support rods 320 protrude, may be a circular surface of a cylinder.

Holder 330 surrounds an outer peripheral surface 3201 of support rod 320. Support rod 320 surrounded by holder 330 may be fitted into opening 3301 in holder 330 and may be moved in the direction in which opening 3301 is opened, i.e., in the longitudinal direction. Holder 330 is supported in a transverse guide hole 3102 in manipulator body 310 so as to be moved in the transverse direction but limited in longitudinal movement thereof. That is, transverse guide hole 3102 is formed in manipulator body 310 to restrain holder 330 in the longitudinal direction (i.e., the direction in which support rod 320 is retracted or discharged) and guide movement of holder 330 in the transverse direction (i.e., the direction in which support rods spread or gather). In summary, holder 300 is fixed and support rod 320 is moved in the longitudinal direction of manipulator body 310 of grip manipulator 300, whereas holder 330 and support rod 320 are moved together in the transverse direction of manipulator body 310 of grip manipulator 300.

At this time, support rod 320 may include a support protrusion 3202 protruding from the outer peripheral surface of the inner end thereof so as to be caught by holder 330. Support protrusion 3202 prevents support rod 320 from being completely separated from manipulator body 310 even if it is pulled outward by an external force, thereby preventing device damage.

The opening in manipulator body 310 described above with reference to FIG. 4 may serve as transverse guide hole 3102.

Figure 9:
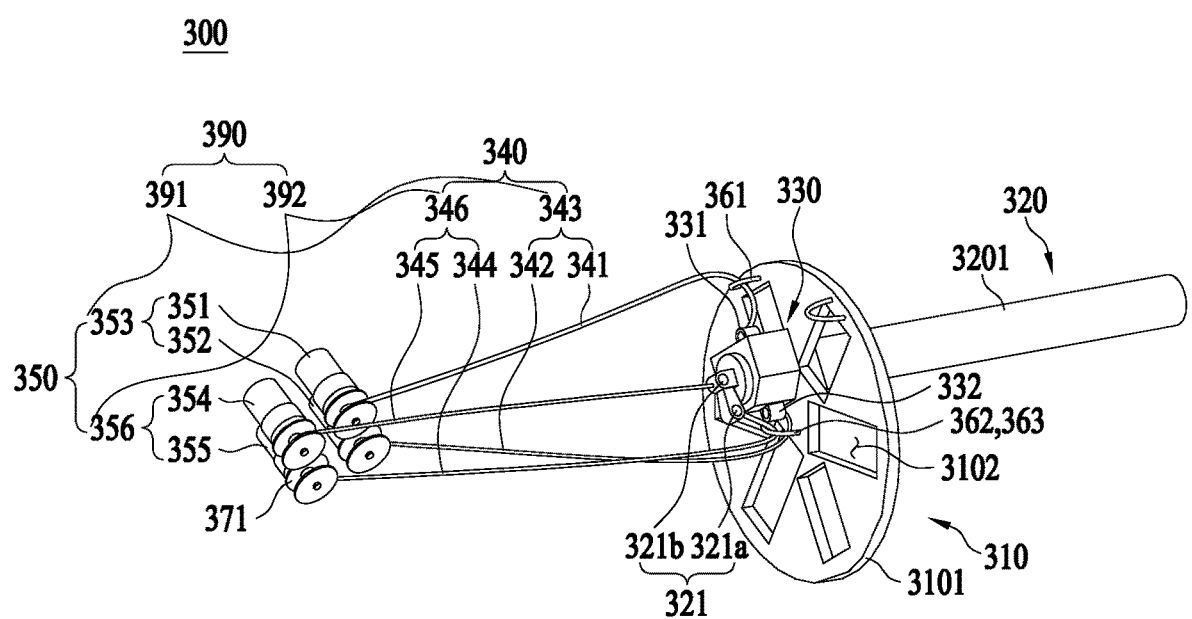
FIG. 9 illustrates the assembled state of some components of the grip manipulator according to the embodiment of the present disclosure.

FIG. 9 illustrates the assembled state of some components of grip manipulator 300 according to the embodiment of the present disclosure.

Transverse drive unit 391 is one component of drive unit 390 and realizes the transverse driving of holder 330 and support rod 320. Transverse drive unit 391 includes a transverse drive wire 343 connected to holder 330 and a transverse drive motor 353 which winds or unwinds transverse drive wire 343 to generate the transverse driving of holder 330. Transverse drive motor 353 winds or unwinds transverse drive wire 343 to spread or gather holder 330 and support rod 320.

Longitudinal drive unit 392 is another component of drive unit 390 and realizes the longitudinal driving of support rod 320. Longitudinal drive unit 392 includes a longitudinal drive wire 346 connected to support rod 320 and a longitudinal drive motor 356 connected to longitudinal drive wire 346 to wind or unwind longitudinal drive wire 346. Longitudinal drive motor 356 winds or unwinds longitudinal drive wire 346 to move support rod 320 in the direction in which support rod 320 is retracted or discharged.

Transverse drive wire 343 may include a first wire 341 and a second wire 342. First wire 341 is connected to one side 331 of holder 330, and second wire 342 is connected to a remaining side 332 of holder 330. When transverse drive motor 353 winds first wire 341 and unwinds second wire 342, holder 330 and support rod 320 are moved toward one side 331. On the contrary, when transverse drive motor 353 winds first wire 341 and unwinds second wire 342, holder 330 and support rod 320 are moved toward remaining side 332. Here, one side 331 is one of the direction in which support rods 320 spread or the direction in which support rods 320 gather, and remaining side 332 is the other one of the directions.

To realize effective force transfer, first wire 341 may pass through a first hole 361 formed in one position of the inner surface of manipulator body 310 located near one side 331 of holder 330, and second wire 342 may pass through a second hole 362 formed in one position of the inner surface of manipulator body 310 located near remaining side 332 of holder 330. That is, first hole 361, one side 331 of holder 330 connected to first wire 341, remaining side 332 of holder 330 connected to second wire 342, and second hole 362 may be located on a straight line in the transverse direction of support rod 320 (i.e., in the direction in which support rods 320 spread or gather).

Longitudinal drive wire 346 may include a third wire 344 and a fourth wire 345 which are connected to an inner end 321 of support rod 320. When third wire 344 is wound, support rod 320 is moved so as to be discharged. When fourth wire 345 is wound, support rod 320 is moved so as to be retracted. Since longitudinal drive motor 356 is located inside manipulator body 310 in the direction in which support rod 320 is retracted, third wire 344 may pass through a third hole 363 provided in the direction in which support rod 320 is discharged in order to apply force for discharging support rod 320. Third hole 363 may be provided in one position of the inner surface of manipulator body 310 or holder 330 in which corresponding support rod 320 is provided. At this time, third hole 363 may be the same as second hole 362 through which second wire 342 passes. Since holder 330 is located closer to the discharge direction of support rod 320 than inner end 321 of support rod 320 when support rod 320 is retracted or discharged, by winding third wire 344 passing through third hole 363, support rod 320 receives force so as to be discharged. That is, third hole 363 is located in one position closer to the discharge direction of support rod 320 than inner end 321 of support rod 320 connected to third wire 344.

Inner end 321 may be divided into an inner end 321a connected to third wire 344 and an inner end 321b connected to fourth wire 345, and inner end 321a and inner end 321b may be located at different positions. This serves to position inner end 321a connected to third wire 344 outside inner end 321b connected to fourth wire 345 in order to realize effective force transfer from inner end 321a to third hole 363.

First hole 361 to third hole 363 described above may be through-holes formed in manipulator body 310, or may be loops formed on manipulator body 310.

Transverse drive motor 353 may include a first motor 351 connected to first wire 341 and a second motor 352 connected to second wire 342. First motor 351 may adjust the winding and unwinding of first wire 341 and second motor 352 may adjust the winding and unwinding of second wire 342. On the other hand, longitudinal drive motor 356 may include a third motor 354 connected to third wire 344 and a fourth motor 355 connected to fourth wire 345. In the same manner, third motor 354 may adjust the winding and unwinding of third wire 344 and fourth motor 355 may adjust the winding and unwinding of fourth wire 345. Meanwhile, each drive motor 350 may include a unidirectional pulley 371 for forming a region in which the wire is wound or unwound.

Figure 10:
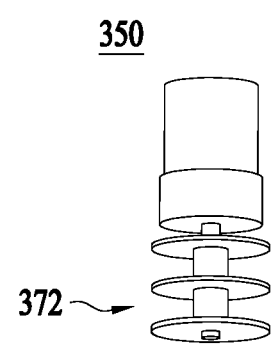
FIG. 10 illustrates another embodiment of a motor provided in the grip manipulator according to the present disclosure.

FIG. 10 illustrates another embodiment of motor 350 provided in grip manipulator 300 according to the present disclosure. To assist understanding, reference will be made in conjunction with FIG. 9.

Since first wire 341 and second wire 342 are subordinate to the transverse driving of support rod 320, second wire 342 is unwound as much as first wire 341 is wound, or first wire 341 is unwound as much as second wire 342 is wound. In addition, since third wire 344 and fourth wire 345 are subordinate to the longitudinal driving of support rod 320, fourth wire 345 is unwound as much as third wire 344 is wound, or third wire 344 is unwound as much as fourth wire 345 is wound. Thus, first wire 341 and second wire 342 may be connected to one motor, and third wire 344 and fourth wire 346 may be connected to one motor, which may result in a simplified mechanism. Accordingly, the former serves as transverse drive motor 353 (see FIG. 9), and the latter serves as longitudinal drive motor 356 (see FIG. 9). Each of transverse drive motor 353 and longitudinal drive motor 356 may include a bidirectional pulley 372, to which respective wires 340 are connected so as to be wound in opposite directions, so that one wire 340 is wound when remaining wire 340 is unwound.

Figure 11:
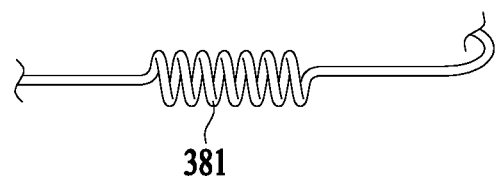
FIG. 11 illustrates a further embodiment of the motor provided in the grip manipulator according to the present disclosure.

FIG. 11 illustrates a further embodiment of motor 350 provided in grip manipulator 300 according to the present disclosure. To assist understanding, reference will be made in conjunction with FIG. 9.

At least one wire 340 of two wires 340 connected to one motor may include a spring 381. Spring 381 serves to tightly pull wire 340 and also serves to absorb shocks caused during sudden motor rotation.

It will be clearly understood by those skilled in the art that the present disclosure may be realized in other particular forms within a range that does not deviate from the spirit and essential features of the present disclosure.

From the foregoing, it will be appreciated that various embodiments of the present disclosure have been described herein for purposes of illustration, and that various modifications may be made without departing from the scope and spirit of the present disclosure. Accordingly, the various

[Description of Reference Numerals]

| | |
|---|---|
| 300: grip manipulator | 310: manipulator body |
| 3101: one surface of manipulator body | 3102: transverse guide hole |
| 3103: opening | 320: support rod |
| 320a: support rods of first group | 320b: support rods of second group |
| 3201: outer peripheral surface of support rod | 3203: support protrusion |
| 321: inner end of support rod | 321a: first inner end of support rod |
| 321b: second inner end of support rod | 330: holder |
| 3301: holder opening | 331: one side of holder |
| 332: remaining side of holder | 340: wire |
| 341: first wire | 342: second wire |
| 343: transverse drive wire | 344: third wire |
| 345: fourth wire | 346: longitudinal drive wire |
| 350: motor | 351: first motor |
| 352: second motor | 353: transverse drive motor |
| 354: third motor | 355: fourth motor |
| 356: longitudinal drive motor | 361: first hole |
| 362: second hole | 363: third hole |
| 371: unidirectional pulley | 372: bidirectional pulley |
| 381: spring | 390: drive unit |
| 391: transverse drive unit | 392: longitudinal drive unit |
| 400: object | |

What is claimed is:

1. A grip manipulator comprising:
a manipulator body; and
a plurality of support rods of a first group and a plurality of support rods of a second group provided to protrude from the manipulator body in a protruding direction,
wherein the plurality of support rods of the first group are configured to be discharged or retracted in the protruding direction, and to be spread or gathered in a second direction perpendicular to the protruding direction,
wherein the plurality of support rods of the second group are configured to be discharged or retracted in the protruding direction, and to be spread or gathered in the second direction,
wherein the plurality of support rods of the first group and the plurality of support rods of the second group are alternately provided on a circumference,
wherein the grip manipulator further comprises:
a longitudinal drive unit including a motor for discharging or retracting the plurality of support rods of the first group and the plurality of support rods of the second group;
a transverse drive unit including a motor for spreading or gathering the plurality of support rods of the first group and the plurality of support rods of the second group; and
a controller configured to control driving of each of the longitudinal drive unit and the transverse drive unit,
wherein the discharging and retracting of the plurality of support rods of the first group and the plurality of support rods of the second group are driven independently of the spreading and gathering of the plurality of support rods of the first group and the plurality of support rods of the second group, and
wherein the discharging/retracting and spreading/gathering of the plurality of support rods of each group is done independently of the other group.

2. The grip manipulator of claim 1, wherein the controller issues an object discharge instruction of sequentially performing:
an operation of spreading the plurality of support rods of the first group;
an operation of retracting the plurality of support rods of the first group that has spread;
an operation of gathering the plurality of support rods of the first group that has been retracted;
an operation of spreading the plurality of support rods of the second group; and
an operation of discharging the plurality of support rods of the first group that has gathered.

3. The grip manipulator of claim 2, wherein the plurality of support rods of the first group has a preset retraction distance and a preset discharge distance, and the retraction distance and the discharge distance have the same value.

4. The grip manipulator of claim 3, further comprising a distance sensor provided on the manipulator body to measure a distance from the manipulator body to an object,
wherein the controller repeatedly issues the object discharge instruction until the distance from the manipulator body to the object, measured by the distance sensor, exceeds a preset threshold.

5. The grip manipulator of claim 2, wherein the controller issues a washing instruction of sequentially performing:
an operation of spreading the plurality of support rods of the first group;
an operation of retracting the plurality of support rods of the first group that has spread;
an operation of spraying pressurizing water on an object;
an operation of discharging the plurality of support rods of the first group;
an operation of gathering the plurality of support rods of the first group that has been discharged;
an operation of spreading the plurality of support rods of the second group;
an operation of retracting the plurality of support rods of the second group that has spread; and
an operation of spraying pressurizing water on the object.

6. The grip manipulator of claim 1, further comprising:
a holder forming an opening into which the plurality of support rods is fitted; and
a transverse guide hole formed in the body to restrain the holder in the direction in which the plurality of support rods is retracted or discharged and guide movement of the holder in the direction in which the plurality of support rods spreads or gathers,
wherein the plurality of support rods is moved in the holder in the direction in which the plurality of support rods is retracted or discharged.

7. The grip manipulator of claim 6, wherein the plurality of support rods includes a support protrusion protruding from an outer peripheral surface of an inner end thereof so as to be caught by the holder.

8. The grip manipulator of claim 7, wherein the manipulator body further comprises an opening providing an area so that the plurality of support rods of the first group and the plurality of support rods of the second group protrude, and
wherein the opening serves as the transverse guide hole.

9. The grip manipulator of claim 6, wherein the transverse drive unit includes:
a transverse drive wire connected to the holder; and
a transverse drive motor configured to unwind or wind the transverse drive wire so as to move the holder in the direction in which the plurality of support rods spreads or gathers, and
wherein the longitudinal drive unit includes:
a longitudinal drive wire connected to the plurality of support rods; and a longitudinal drive motor configured to unwind or wind the longitudinal drive wire so as to move the plurality of support rods in the direction in which the plurality of support rods is retracted or discharged.

10. The grip manipulator of claim 9, wherein the transverse drive wire includes:
a first wire connected to one side of the holder; and
a second wire connected to a remaining side of the holder,
wherein the longitudinal drive wire includes a third wire and a fourth wire that are connected to an inner end of the plurality of support rods, and
wherein the grip manipulator further comprises:
a first hole formed in one side of the transverse guide hole so that the first wire passes through the first hole;
a second hole formed in a remaining side of the transverse guide hole so that the second wire passes through the second hole; and
a third hole formed in the holder or the manipulator body so that the third wire passes through the third hole.

11. The grip manipulator of claim 10, wherein the first hole, the one side of the holder connected to the first wire, the remaining side of the holder connected to the second wire, and the second hole are located on a straight line in the direction in which the plurality of support rods spreads or gathers, and
wherein the third hole is located closer to the direction in which the plurality of support rods is discharged than the inner end of the plurality of support rods connected to the third wire.

12. The grip manipulator of claim 10, wherein the transverse drive motor includes:
a first motor connected to the first wire; and
a second motor connected to the second wire, and
wherein the longitudinal drive motor includes:
a third motor connected to the third wire; and
a fourth motor connected to the fourth wire.

13. The grip manipulator of claim 10, wherein the transverse drive motor includes a bidirectional transverse drive motor having a bidirectional pulley to which the first wire and the second wire are connected so as to be wound in opposite directions, and
wherein the longitudinal drive motor includes a bidirectional longitudinal drive motor having a bidirectional pulley to which the third wire and the fourth wire are connected so as to be wound in opposite directions.

14. The grip manipulator of claim 10, wherein at least one of the wires is connected by an elastic spring at one position.

15. The grip manipulator of claim 1, further comprising at least one sensor among a pressure sensor, an image sensor, a humidity sensor, and a distance sensor that sense a state of an object,
wherein a value measured by the at least one sensor is reflected in an instruction transmitted from a controller to each drive unit.

16. A method of controlling a grip manipulator comprising a plurality of support rods of a first group and a plurality of support rods of a second group provided to protrude from a manipulator body, the method comprising:
an operation of spreading the plurality of support rods of the first group;
an operation of retracting the plurality of support rods of the first group that has spread;
an operation of gathering the plurality of support rods of the first group that has been retracted;
an operation of spreading the plurality of support rods of the second group; and
an operation of discharging the plurality of support rods of the first group that has gathered,
wherein the operations are performed in sequence,
wherein the discharging or retracting the plurality of support rods of the first group is operated by a motor included in a longitudinal drive unit,
wherein the spreading or gathering the plurality of support rods of the first group and the spreading of the plurality of support rods of the second group is operated by a motor included in a transverse drive unit, and
wherein a driving of each of the longitudinal drive unit and the transverse drive unit is controlled by a controller.

17. The method of claim 16, wherein the operations are repeatedly performed until a distance from the manipulator body to an object, measured by a distance sensor provided on the manipulator body, exceeds a preset threshold.

18. A method of controlling a grip manipulator comprising a plurality of support rods of a first group and a plurality of support rods of a second group provided to protrude from a manipulator body, the method comprising:
an operation of spreading the plurality of support rods of the first group;
an operation of retracting the plurality of support rods of the first group that has spread;
an operation of spraying pressurizing water on an object;
an operation of discharging the plurality of support rods of the first group;
an operation of gathering the plurality of support rods of the first group that has been discharged;
an operation of spreading the plurality of support rods of the second group;
an operation of retracting the plurality of support rods of the second group that has spread; and
an operation of spraying pressurizing water on the object,
wherein the operations are performed in sequence,
wherein the discharging or retracting the plurality of support rods of the first group and the retracting of the plurality of support rods of the second group is operated by a motor included in a longitudinal drive unit,
wherein the spreading or gathering the plurality of support rods of the first group and the spreading of the plurality of support rods of the second group is operated by a motor included in a transverse drive unit, and
wherein a driving of each of the longitudinal drive unit and the transverse drive unit is controlled by a controller.

* * * * *